United States Patent
Yu et al.

(10) Patent No.: US 11,086,192 B2
(45) Date of Patent: Aug. 10, 2021

(54) SINGLE SHOT AUTOCORRELATOR FOR MEASURING THE DURATION OF AN ULTRASHORT PULSE IN THE FAR FIELD

(71) Applicant: Shanghai Institute of Optics And Fine Mechanics, Chinese Academy of Sciences, Shanghai (CN)

(72) Inventors: Jianwei Yu, Shanghai (CN); Jianqiang Zhu, Shanghai (CN); Xiaoping Ouyang, Shanghai (CN); Baoqiang Zhu, Shanghai (CN); Peiying Zeng, Shanghai (CN); Xiaoyun Tang, Shanghai (CN)

(73) Assignee: Shanghai Institute of Optics And Fine Mechanics, Chinese Academy of Sciences, Shanghai (CN)

(*) Notice: Subject to any disclaimer, the term of this patent is extended or adjusted under 35 U.S.C. 154(b) by 202 days.

(21) Appl. No.: 16/355,679

(22) Filed: Mar. 15, 2019

(65) Prior Publication Data
US 2020/0292382 A1 Sep. 17, 2020

(51) Int. Cl.
*G02F 1/37* (2006.01)
*G01J 1/42* (2006.01)
(Continued)

(52) U.S. Cl.
CPC .............. *G02F 1/37* (2013.01); *G01J 1/0403* (2013.01); *G01J 1/0414* (2013.01);
(Continued)

(58) Field of Classification Search
CPC ...... G01J 1/4257; G01J 1/0414; G01J 1/0448; G01J 1/0403; G01J 1/16; G01J 1/44;
(Continued)

(56) References Cited

U.S. PATENT DOCUMENTS 4,973,160 A * 11/1990 Takiguchi ................ G01J 11/00
356/450
5,754,292 A * 5/1998 Kane ........................ G01J 11/00
356/450

(Continued)

OTHER PUBLICATIONS

F. Salin et al., "Single-shot measurement of a 52-fs pulse," Applied Optics, vol. 26, No. 21, pp. 4528-4531 (1987).

(Continued)

*Primary Examiner* — Jennifer D Bennett
(74) *Attorney, Agent, or Firm* — Mei & Mark LLP; Manni Li (57) ABSTRACT

A single shot autocorrelator for measuring duration of an ultrashort laser pulse in the far field, having a beam splitter to form two beams from an input ultrashort pulse: the reflected beam is firstly reflected by two mirrors mounted on a translation stage for adjusting time delay and subsequently a third mirror, and after focused by a spherical convex lens, enters a naturally grown strontium barium niobate crystal along the crystal z axis; the transmitted beam is firstly focused by a spherical convex lens, and after reflected by two mirrors, enters the crystal along the crystal z axis from opposite direction. The crystal is in the common focal regions of two spherical convex lenses and generates the transverse second harmonic pulse beam that is the autocorrelation signal to be recorded, which is imaged with an optical microscope onto a charge coupled device camera mounted perpendicular to the beams.

4 Claims, 7 Drawing Sheets

(51) Int. Cl.
G02B 21/36 (2006.01)
G02F 1/355 (2006.01)
G01J 1/04 (2006.01)
G01J 1/16 (2006.01)
G01J 1/44 (2006.01)

(52) U.S. Cl.
CPC .............. *G01J 1/0448* (2013.01); *G01J 1/16* (2013.01); *G01J 1/4257* (2013.01); *G01J 1/44* (2013.01); *G02B 21/36* (2013.01); *G02F 1/3551* (2013.01); *G01J 2001/448* (2013.01)

(58) Field of Classification Search
CPC ..... G01J 2001/448; G01J 11/00; G02B 21/36; G02F 1/3551; G02F 1/37
See application file for complete search history.

(56) References Cited

U.S. PATENT DOCUMENTS

2004/0141180 A1* 7/2004 Wan .................. G01J 11/00 356/450
2006/0044642 A1* 3/2006 Pan ........................ G02F 1/39 359/330
2012/0228501 A1* 9/2012 Qian ...................... G01J 11/00 250/338.1

OTHER PUBLICATIONS

J. Giordmaine et al., "Two-photon excitation of fluorescence by picosecond light pulses," Applied Physics Letters, vol. 11, No. 7, pp. 216-218 (1967).

B. Liesfeld et al., "Single-shot autocorrelation at relativistic intensity," Applied Physics Letters, vol. 86, pp. 161107-1 to 161107-3, total 3 pages (2005).

R. Fischer et al., "Monitoring ultrashort pulses by transverse frequency doubling of counterpropagating pulses in random media," Applied Physics Letters, vol. 91, pp. 031104-1 to031104-3, total 3 pages (2007).

Jianwei Yu et al., "Experimental study on measuring pulse duration in the far field for high-energy petawatt lasers," Applied Optics, vol. 57, No. 13, pp. 3488-3496 (May 1, 2018).

* cited by examiner

SINGLE SHOT AUTOCORRELATOR FOR MEASURING THE DURATION OF AN ULTRASHORT PULSE IN THE FAR FIELD

BACKGROUND OF THE INVENTION

Field of the Invention

The present invention generally relates to systems and methods for measuring the duration of an ultrashort laser pulse, in particular, measuring the pulse duration in the far field in a single shot.

Description of the Prior Art

Accurate measurement of the duration of an ultrashort laser pulse is very important for the study of laser matter interaction. For example, in the process of the chirped pulse amplification, an autocorrelator is routinely used to measure the pulse duration. There are multi shot autocorrelators and single shot autocorrelators. Herein, the interest is particularly turned to single shot autocorrelators.

A single shot autocorrelator works by the splitting of an input ultrashort pulse beam to be measured into two replicas at a fundamental frequency ($\omega$) and then recombining them in a nonlinear crystal which produces a sum frequency signal ($2\omega$) when they overlap both spatially and in time. Assuming the intensity across the diameter of the fundamental beam is constant, the transverse intensity distribution of the sum frequency signal is directly related to the intensity distribution in time of the ultrashort pulse to be measured. See F. Salin et al., "Single-shot measurement of a 52-fs pulse," Appl. Opt. 26, 4528-4531 (1987). Generally, the requirement of constant intensity across the diameter of the fundamental beam fails in the process of chirped pulse amplification. What is more, the presence of spatial temporal couplings in the ultrashort pulse beam leads to an increase of pulse duration in the focus (far field). The pulse duration in the far field is called global pulse duration, which cannot be obtained with usual single shot autocorrelator utilizing beam overlap in the near field.

Single shot autocorrelators based on two photon fluorescence of two counter-propagating pulses in dyes (J. Giordmaine et al., "Two-photon excitation of fluorescence by picosecond light pulses," Appl. Phys. Lett. 11, 216-218 (1967)) and nonlinear Thomson scattering from plasma electrons at relativistic intensity (B. Liesfeld et al., "Single-shot autocorrelation at relativistic intensity," Appl. Phys. Lett. 86, 161107 (2005)) can overcome the influence of non-uniform intensity distribution across the beam spatial profile and obtain the global pulse duration in the focus in the presence of spatial temporal coupling. However, the former suffers from rather low contrast of the autocorrelation trace with a signal-to-background ratio of at most 3:1 and fast dye degradation, while the latter cannot be used to monitor pulse duration in real time due to the requirement of extremely high pulse energy.

A single shot autocorrelator using an as-grown strontium barium niobate (SBN) crystal with two counter-propagating fundamental beams can detect the existence of certain type of spatial temporal coupling. However, the signal-to-background ratio is limited to 4, the global pulse duration in the focus cannot be obtained and the measurement can still be affected by the non-uniform intensity distribution across the beam spatial profile. See R. Fischer et al., "Monitoring ultrashort pulses by transverse frequency doubling of counterpropagating pulses in random media," Appl. Phys. Lett. 91, 031104 (2007).

SUMMARY OF THE INVENTION

In order to remedy the drawbacks of prior arts, the present invention provides a single shot autocorrelator for measuring the pulse duration of an ultrashort laser pulse in the far field.

The present invention provides a far field single shot autocorrelator that comprises a beam splitter, a translation stage, two pairs of mirrors, one of the pairs being mounted on the translation stage for adjusting time delay, at least one spherical convex lens having a focal region, a naturally grown strontium barium niobate (SBN) crystal having a crystal z axis and being positioned in the focal region of the spherical convex lens, an optical microscope, and a charge coupled device (CCD) camera mounted perpendicular to beams. The beam splitter splits an input ultrashort pulse P to form a reflected beam $P_r$ and a transmitted beam $P_t$; the reflected beam $P_r$ is reflected by the pair of mirrors mounted on the translation stage for adjusting time delay, and enters the SBN crystal 7 along the crystal z axis from a first direction; the transmitted beam $P_t$ is reflected by the other pair of mirrors and enters the SBN crystal along the crystal z axis from a second direction opposing the first direction, and the SBN crystal generates a transverse second harmonic pulse beam based on the reflected beam $P_r$ and the transmitted beam $P_t$ entering from opposing directions, the transverse second harmonic pulse beam is an autocorrelation signal to be recorded and is imaged with the optical microscope onto the charge coupled device (CCD) camera.

In one preferred embodiment of the present invention, the single shot autocorrelator working in the far field utilizes a beam splitter to form two beams from an input ultrashort pulse. The reflected beam from the beam splitter is firstly reflected by two mirrors mounted on a translation stage for adjusting the time delay and subsequently the third mirror, and after focused by a spherical convex lens, enters a naturally grown strontium barium niobate (SBN) crystal along the crystal z axis. The transmitted beam from the beam splitter is firstly focused by a spherical convex lens, and after reflected by two mirrors, enters the naturally grown SBN crystal along the crystal z axis from the opposite direction. The position of SBN crystal is in the common focal regions of two spherical convex lenses. The transverse second harmonic pulse beam generated by the SBN crystal is the autocorrelation signal to be recorded, which is imaged with an optical microscope onto a charge coupled device (CCD) camera mounted perpendicular to the beams.

In an alternative embodiment of the present invention, the ultrashort pulse is firstly focused with a long focal length spherical convex lens and then reflected by a mirror. With a beam splitter, two beams are formed from the focused pulse. The reflected beam from the beam splitter is firstly reflected by two mirrors and enters a naturally grown SBN crystal along the crystal z axis. The transmitted beam from the beam splitter is reflected by two mirrors and mounted on a translation stage for adjusting the time delay, and enters the naturally grown SBN crystal along the crystal z axis from the opposite direction. The position of SBN crystal is in the focal region of the spherical convex lens. The transverse second harmonic pulse beam generated by the SBN crystal is the autocorrelation signal to be recorded, which is imaged with an optical microscope onto a charge coupled device (CCD) camera mounted perpendicular to the beams.

The single shot autocorrelator of the present invention working in the far field differs from the existing technology where it focuses the two ultrashort pulse beams with the spherical convex lenses into a naturally grown SBN crystal along the crystal z axis from the opposite direction. The position of SBN crystal is in the common focal regions of two spherical convex lenses. The use of the spherical convex lens is to overcome the influence of intensity modulations in the near field on the measurement, and to obtain the global pulse duration in the presence of spatial-temporal coupling in fundamental beams. The use of a naturally grown SBN crystal as the nonlinear crystal takes advantage of its ability of transverse second harmonic generation, stable physicochemical properties and low nonlinear optical conversion threshold. The geometry of two fundamental pulse entering in the opposite directions along the crystal z axis is to eliminate the background from autocorrelation trace.

In the present document, it is meant by ultrashort laser pulse a pulse having a duration from the order of hundreds of femtosecond to hundreds of picosecond. The wavelength of the ultrashort laser pulse may be located from 800 nm to 6 μm.

In the present invention, the temporal pulse duration can be estimated from the spatial width of the autocorrelation signal by assuming a specific temporal shape. This single shot autocorrelator measures the duration of an ultrashort pulse in the far field, which is more accurate than previous technology in the presence of intensity modulations in the near field and spatial-temporal coupling in the ultrashort laser pulse beam. The second harmonic generation crystal used in the single shot autocorrelator has stable physicochemical properties and low nonlinear optical conversion threshold. The geometry of two fundamental pulse entering in the opposite directions along the crystal z axis can eliminate the background from autocorrelation trace.

DETAILED DESCRIPTION OF THE INVENTION AND EMBODIMENTS

Although specific embodiments of the present invention are described with reference to the drawings, it should be understood that such embodiments are by way example only merely illustrative of but a small number of the many possible specific embodiments which can represent applications of the present invention. Various changes and modifications obvious to one skilled in the art the present invention pertains are deemed to be within the spirit, scope and contemplation of the present invention as further defined in appended claims.

Single shot autocorrelators characterizes ultrashort pulses, when time resolution through other methods (direct photodiode measurement, streak cameras etc.) is inadequate or pulse repetition rate is so low that multi shot autocorrelators cannot work effectively. The present invention is to measure the pulse duration of an ultrashort pulse in the far field by detecting the signal of transverse second harmonic generation by the nonlinear effect of two counter counter-propagating fundamental beams (ω) coupled in media with randomly oriented ferroelectric domains, such as an as-grown strontium barium niobate (SBN) crystal. Advantages of the far field single shot autocorrelator of the present invention are immune to the influence of intensity modulations in the near field of the beam spatial profile on the measurement, able to obtain the global pulse duration in the presence of spatial-temporal coupling in fundamental beams, of stable physicochemical properties with the use of media for second harmonic generation, low nonlinear optical conversion threshold and free of background in the autocorrelation trace.

Figure 1:
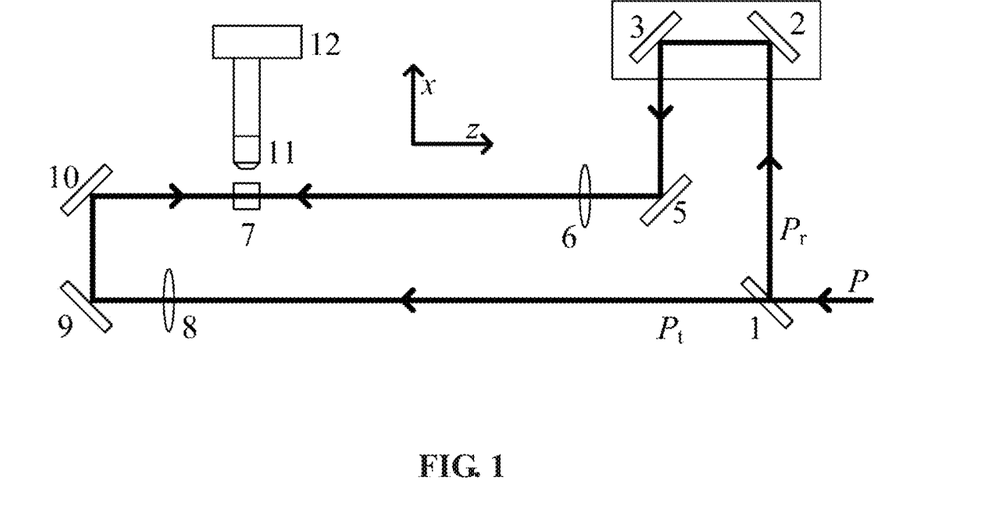
FIG. 1 depicts a far field single shot autocorrelator in accordance with a first embodiment of the present invention.

FIG. 1 shows one of the preferred embodiments of the present invention. The single shot autocorrelator working in the far field utilizes a beam splitter 1 to form two beams $P_r$ and $P_t$ from an input ultrashort pulse P. The reflected beam $P_r$ from the beam splitter 1 is firstly reflected by two mirrors 2 and 3 mounted on a translation stage 4 for adjusting the time delay and subsequently the third mirror 5, and after focused by a spherical convex lens 6, enters a naturally grown strontium barium niobate (SBN) crystal 7 along the crystal z axis. The transmitted beam $P_t$ from the beam splitter 1 is firstly focused by a spherical convex lens 8, and after reflected by two mirrors 9 and 10, enters the naturally grown SBN crystal 7 along the crystal z axis from the opposite direction. The position of SBN crystal 7 is in the common focal regions of two spherical convex lenses 6 and 8. The transverse second harmonic pulse beam generated by the SBN crystal is the autocorrelation signal to be recorded, which is imaged with an optical microscope 11 onto a charge coupled device (CCD) camera 12 mounted perpendicular to the beams. The spherical lenses 6 and 8 both have a focal length of 300 mm, the microscope objective is at 4× magnification and the model of CCD camera is SP620U; Spiricon Ltd.

Figure 2:
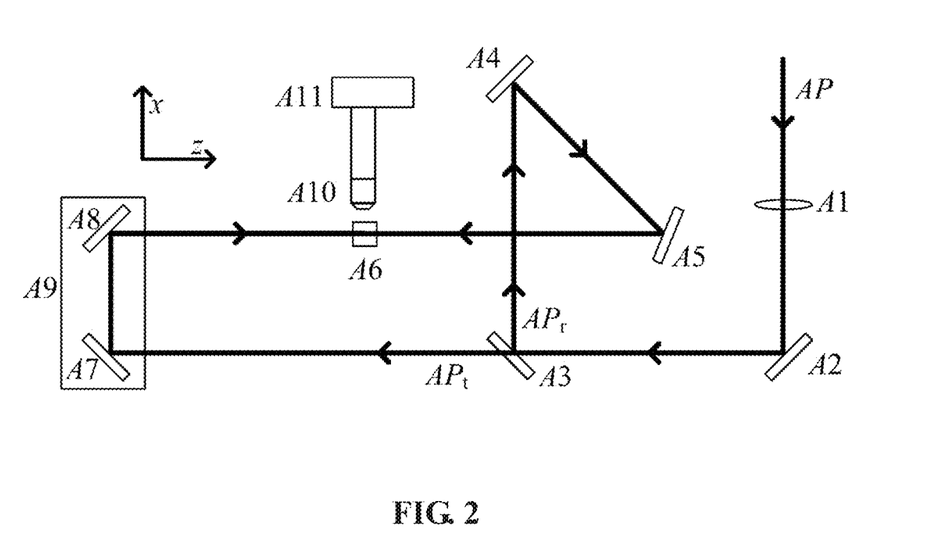
FIG. 2 depicts a far field single shot autocorrelator in accordance with a second embodiment of the present invention.

FIG. 2 shows an alternative embodiment of the present invention, where the ultrashort pulse AP is firstly focused with a long focal length spherical convex lens A1 and then reflected by a mirror A2. With a beam splitter A3, two beams $AP_r$ and $AP_t$ are formed from the focused pulse AP. The reflected beam $AP_r$ from the beam splitter A3 is firstly reflected by two mirrors A4 and A5, and enters a naturally grown SBN crystal A6 along the crystal z axis. The transmitted beam $AP_t$ from the beam splitter A3 is reflected by two mirrors A7 and A8 mounted on a translation stage A9 for adjusting the time delay, and enters the naturally grown SBN crystal A6 along the crystal z axis from the opposite direction. The position of SBN crystal A6 is in the focal region of the spherical convex lens A1. The transverse second harmonic pulse beam generated by the SBN crystal is the autocorrelation signal to be recorded, which is imaged with an optical microscope A10 onto a charge coupled device (CCD) camera A11 mounted perpendicular to the beams.

The spatial width of the sum frequency signal $z_{FWHM}$ is related to the temporal pulse duration $\tau_{FWHM}$ of the ultrashort pulse, which is usually calibrated by introduction of a delay $\Delta t$ into one of the replicas, and the transverse second harmonic signal shifts a certain amount $\Delta z$ along the transverse direction. By making a hypothesis about the temporal profile of the ultrashort pulse to be measured, the pulse duration is given by $$\tau_{FWHM} = K \cdot z_{FWHM} \cdot \frac{\Delta t}{\Delta z},$$

where K is a form factor depending on the shape of the fundamental pulse to be measured, e.g., $K=(1.414)^{-1}$ for a Gaussian pulse. The autocorrelator is calibrated by introducing a series of temporal delays with a micrometer in one arm, and the peak shifts of the autocorrelation traces are recorded. By performing linear fitting of the calibration curve, the calibration factor is obtained, which is one pixel of CCD camera corresponding to 18.86 fs.

Figure 3A:
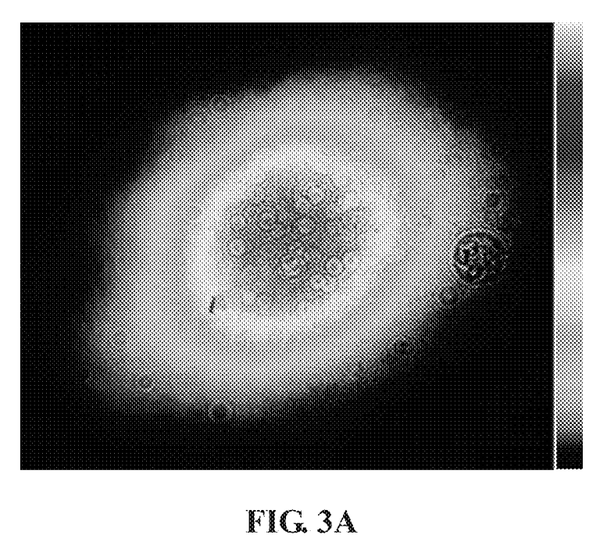
FIG. 3A depicts a graph of the near field beam spatial profile of an ultrashort laser pulse emitting directly from a chirped pulse amplification laser system measured with a CCD camera.
Figure 3B:
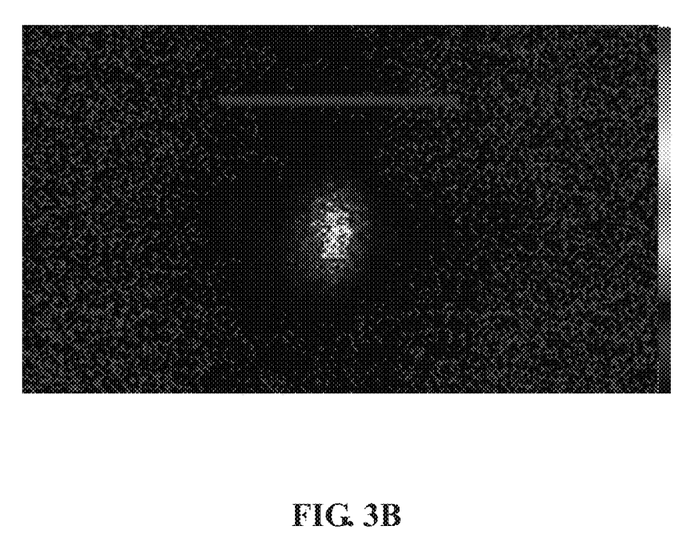
FIG. 3B depicts a graph of the autocorrelation trace of the pulse shown in FIG. 3A measured with a far field single shot autocorrelator in accordance with the first embodiment.
Figure 3C:
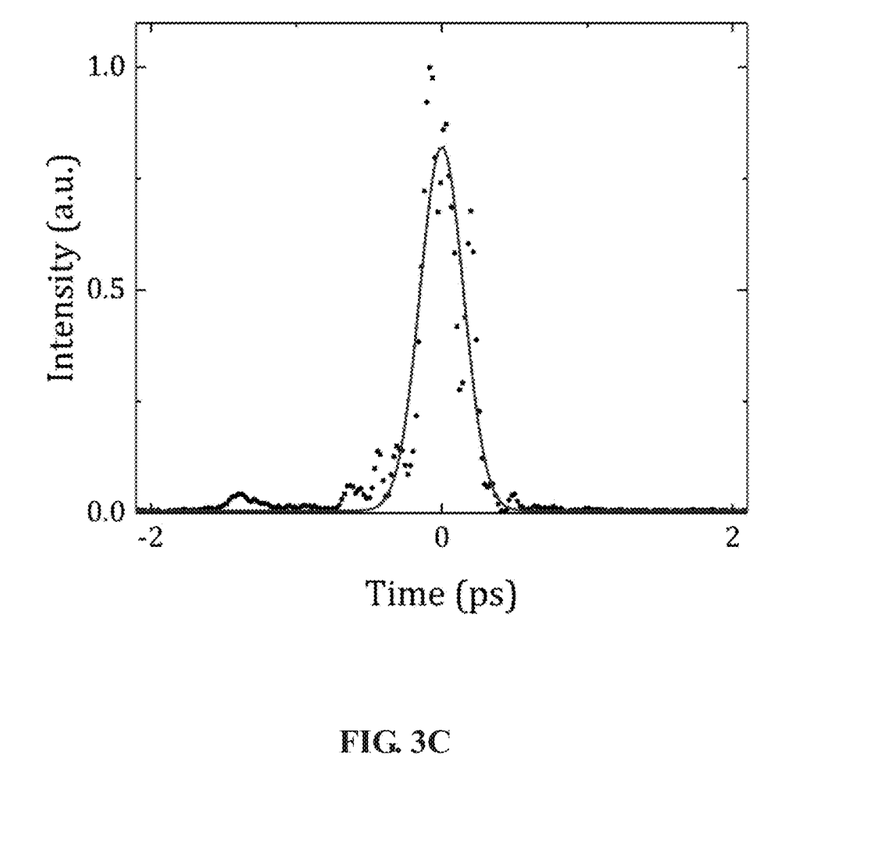
FIG. 3C depicts a graph of the autocorrelation curve extracted from the autocorrelation trace shown in FIG. 3B with black dots representing experimental data and solid line representing fitting curve of experimental data with the Gaussian function.

Referring to FIG. 3A, the near field beam spatial profile of an ultrashort laser pulse emitting directly from a chirped pulse amplification laser system is show, which is measured with a CCD camera (WinCamD-LCM4; DataRay Inc.). The laser system is a Yb:KGW femtosecond laser system (PHAROS from Light Conversion) with maximum pulse average power of 4W, a repetition rate of 40 kHz, and a wavelength of 1028 nm. The beam profile is approximately a Gaussian shape with a FWHM of ~2.5 mm. The nominal Fourier-transform-limited pulse duration is 223 fs. The nominal pulse duration was calibrated with a commercial scanning autocorrelator (PulseCheck; APE GmbH) during the initial deployment of the laser apparatus. The polarization direction of the fundamental pulse beam is in the x-z plane. Referring to FIG. 3B, there is shown the autocorrelation trace of the pulse shown in FIG. 3A measured with a far field single shot autocorrelator in accordance with the first embodiment. Referring to FIG. 3C, there is shown the autocorrelation curve extracted from the autocorrelation trace shown in FIG. 3B with black dots representing experimental data and solid line representing fitting curve of experimental data with the Gaussian function. The FWHM of the fundamental pulse is 248 fs by assuming a Gaussian temporal shape. The discrepancy between the pulse duration measured by FFSSA and the nominal one by the laser manufacturer of Light Conversion is 11.2%, and it may originate from the dispersion of the pulse and imperfect imaging of the autocorrelation trace onto the CCD camera caused by the limited depth of field.

Figure 4A:
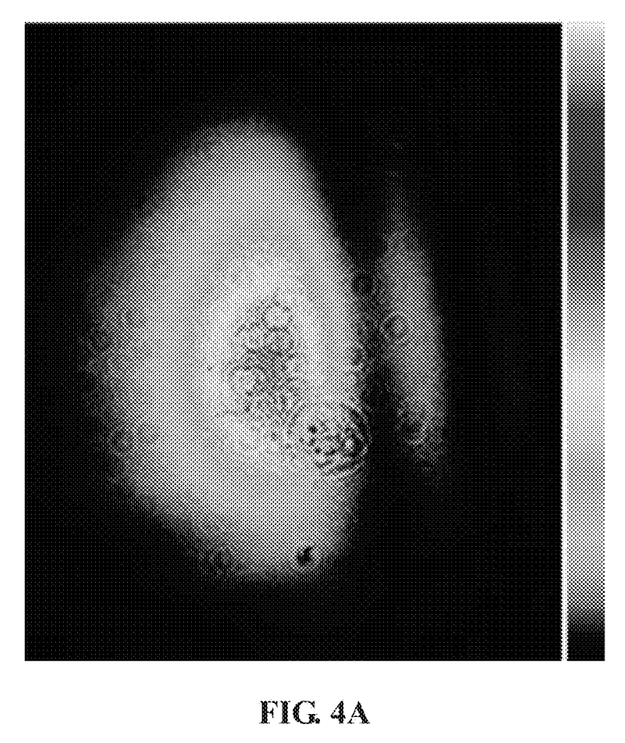
FIG. 4A depicts a graph of the near field beam spatial profile of an ultrashort laser pulse clipped with a knife edge left and right in the plane perpendicular to the beam propagation direction measured with a CCD camera.
Figure 4B:
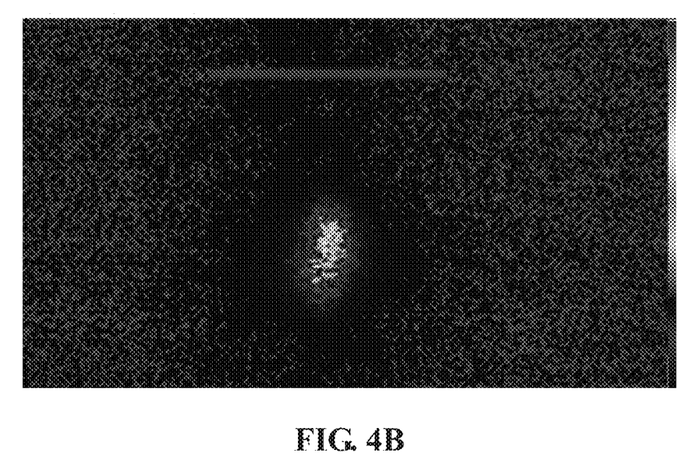
FIG. 4B depicts a graph of the autocorrelation trace of the pulse shown in FIG. 4A measured with a far field single shot autocorrelator in accordance with the first embodiment.
Figure 4C:
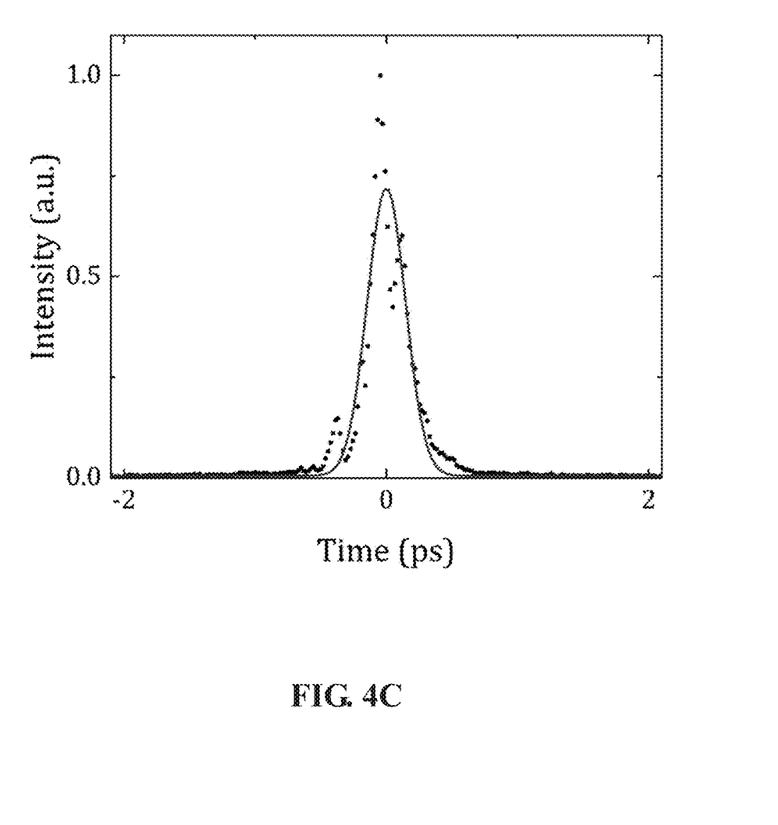
FIG. 4C depicts a graph of the autocorrelation curve extracted from the autocorrelation trace shown in FIG. 4B with black dots representing experimental data and solid line representing fitting curve of experimental data with the Gaussian function.

FIG. 4A shows the near field beam spatial profile of an ultrashort laser pulse clipped with a knife edge left and right in the plane perpendicular to the beam propagation direction, which is measured with a CCD camera (WinCamD-LCM4; DataRay Inc.). FIG. 4B shows the autocorrelation trace of the pulse shown in FIG. 4A measured with a far field single shot autocorrelator in accordance with the first embodiment. FIG. 4C shows the autocorrelation curve extracted from the autocorrelation trace shown in FIG. 4B with black dots representing experimental data and solid line representing fitting curve of experimental data with the Gaussian function. The measured pulse duration is 243 fs, which agrees well with the pulse duration without beam clip in the near field.

Figure 5A:
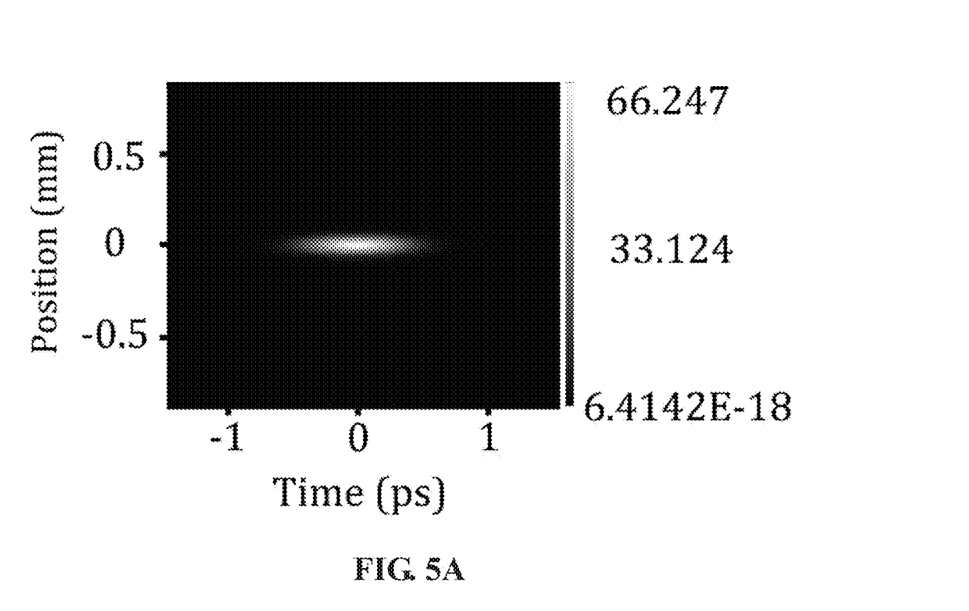
FIG. 5A depicts a graph of the far field pattern of an ultrashort laser pulse with a pulse front tilt angle of ~3.8° in air in the near field of the beam introduced with a 60° (N-SF11 Schott glass) prism with minimum deviation configurations simulated with the software VirtualLab FUSION (www.lighttrans.com)
Figure 5B:
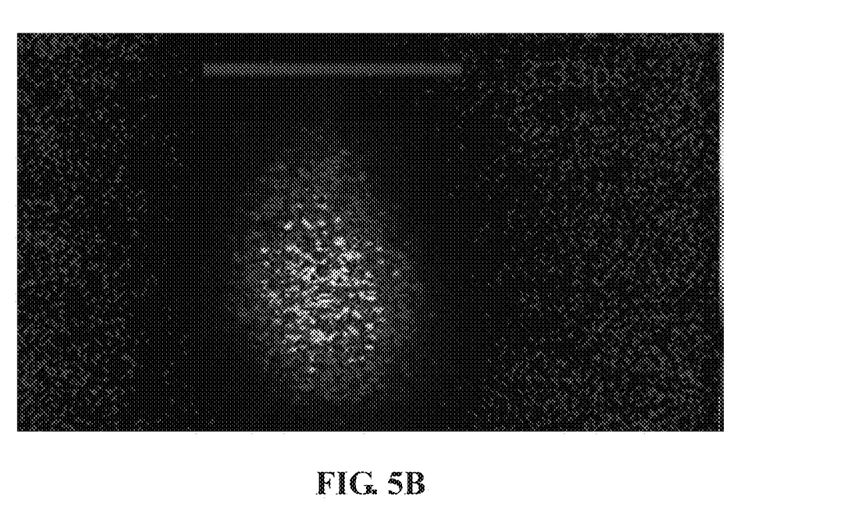
FIG. 5B depicts a graph of the autocorrelation trace of the pulse shown in FIG. 5A measured with a far field single shot autocorrelator in accordance with the first embodiment.
Figure 5C:
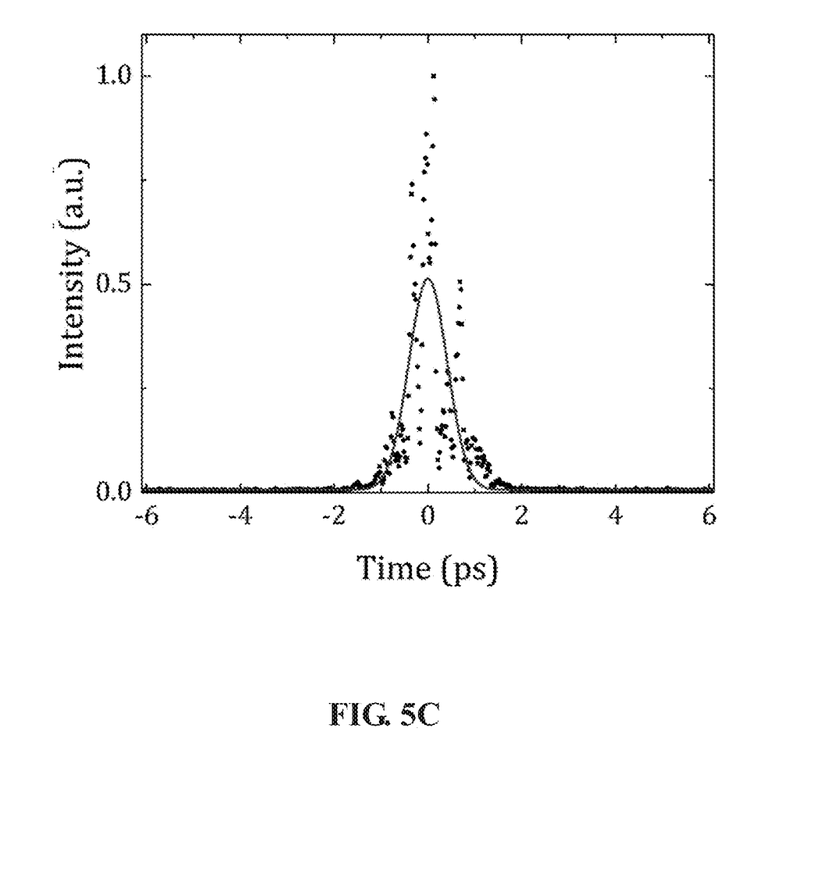
FIG. 5C depicts a graph of the autocorrelation curve extracted from the autocorrelation trace shown in FIG. 5B with black dots representing experimental data and solid line representing fitting curve of experimental data with the Gaussian function.

FIG. 5A shows the far field pattern of an ultrashort laser pulse with a pulse front tilt angle of ~3.8° in air in the near field of the beam introduced with a 60° (N-SF11 Schott glass) prism with minimum deviation configurations, which is simulated with the commercial wave optical modeling software VirtualLab FUSION (www.lighttrans.com). FIG. 5B shows a graph of the autocorrelation trace of the pulse shown in FIG. 5A measured with a far field single shot autocorrelator in accordance with the first embodiment. FIG. 5C shows a graph of the autocorrelation curve extracted from the autocorrelation trace shown in FIG. 5B with black dots representing experimental data and solid line representing fitting curve of experimental data with the Gaussian function. With the help of VirtualLab FUSION, the global pulse duration is calculated to be 625 fs in the focus, and the measured pulse duration with the far field single shot autocorrelator is 681 fs.

We claim:

1. A far field single shot autocorrelator, comprising
a beam splitter (1),
a translation stage (4),
a first pair of mirrors (2) and (3), both mirrors (2) and (3) being mounted on the translation stage (4) for adjusting time delay,
a third mirror (5),
a first spherical convex lens (6) having a focal region,
a second spherical convex lens (8) having a common focal region as the first spherical convex lens (6),
a naturally grown strontium barium niobate (SBN) crystal (7) having a crystal z axis and being positioned in the common focal region of the first and second spherical convex lenses (6) and (8),
a second pair of mirrors (9) and (10),
an optical microscope (11), and
a charge coupled device (CCD) camera (12),
wherein the beam splitter (1) splits an ultrashort pulse to form a reflected beam and a transmitted beam,
the reflected beam is firstly reflected by the first pair of mirrors (2) and (3) mounted on the translation stage (4) for adjusting the time delay, and subsequently reflected by the third mirror (5), and after focused by the first spherical convex lens (6), enters the naturally grown SBN crystal (7) along the crystal z axis from a first direction,
the transmitted beam is firstly focused by the second spherical convex lens (8), and after reflected by the second pair of mirrors (9) and (10), enters the naturally grown SBN crystal (7) along the crystal z axis from a second direction opposing the first direction, and the naturally grown SBN crystal (7) generates a transverse second harmonic pulse beam based on the reflected beam and the transmitted beam entering from the first and second directions, respectively, and the transverse second harmonic pulse beam is an autocorrelation signal that is recorded and imaged with the optical microscope (11) onto the charge coupled device (CCD) camera (12), and the charge coupled device (CCD) camera (12) is mounted perpendicular to the first and second directions of the reflected and transmitted beams.

2. The far field single shot autocorrelator as defined in claim 1, wherein the reflected beam and the transmitted beam split from the ultrashort pulse are focused into the naturally grown SBN crystal 7 along the crystal z axis from the opposite first and second directions using the spherical convex lenses (6) and (8), respectively.

3. A far field single shot autocorrelator, comprising
a spherical convex lens (A1) having a focal region,
a mirror (A2),
a beam splitter (A3),
a first pair of mirrors (A4) and (A5),
a naturally grown strontium barium niobate (SBN) crystal (A6) having a crystal z axis and being positioned in the focal region of the spherical convex lens (A1),
a translation stage (A9),
a second pair of mirrors (A7) and (A8) being mounted on the translation stage (A9) for adjusting time delay,
an optical microscope (A10), and
a charge coupled device (CCD) camera (A11),
wherein an ultrashort pulse is firstly focused with the spherical convex lens (A1) to obtain a focused pulse, the focused pulse is reflected by the mirror (A2) to obtain a reflected pulse, the beam splitter (A3) splits the reflected pulse into a reflected beam and a transmitted beam, the reflected beam is firstly reflected by the first pair of mirrors (A4) and (A5) and enters the naturally grown SBN crystal (A6) along a first direction on the crystal z axis, the transmitted beam is reflected by the second pair of mirrors (A7) and (A8) mounted on the translation stage (A9) for adjusting the time delay and enters the naturally grown SBN crystal (A6) along the crystal z axis from a second direction opposite to the first direction, the naturally grown SBN crystal (A6) generates a transverse second harmonic pulse beam based on the reflected beam and the transmitted beam entering from the first and second directions, respectively, the transverse second harmonic pulse beam is an autocorrelation signal that is recorded and imaged with the optical microscope (A10) onto the charge coupled device (CCD) camera (A11), and the charge coupled device (CCD) camera (A11) is mounted perpendicular to the first and second directions of the reflected and transmitted beams.

4. The far field single shot autocorrelator as defined in claim 3, wherein the ultrashort pulse is focused by the spherical convex lens (A1) before being split into the reflected and transmitted beams by the beam splitter, and the reflected and transmitted beams enter the naturally grown SBN crystal (A6) along the crystal z axis from the first and second directions, respectively.

* * * * *